(No Model.) 2 Sheets—Sheet 1.
H. LEEMING.
TREADLE MECHANISM.
No. 296,854. Patented Apr. 15, 1884.
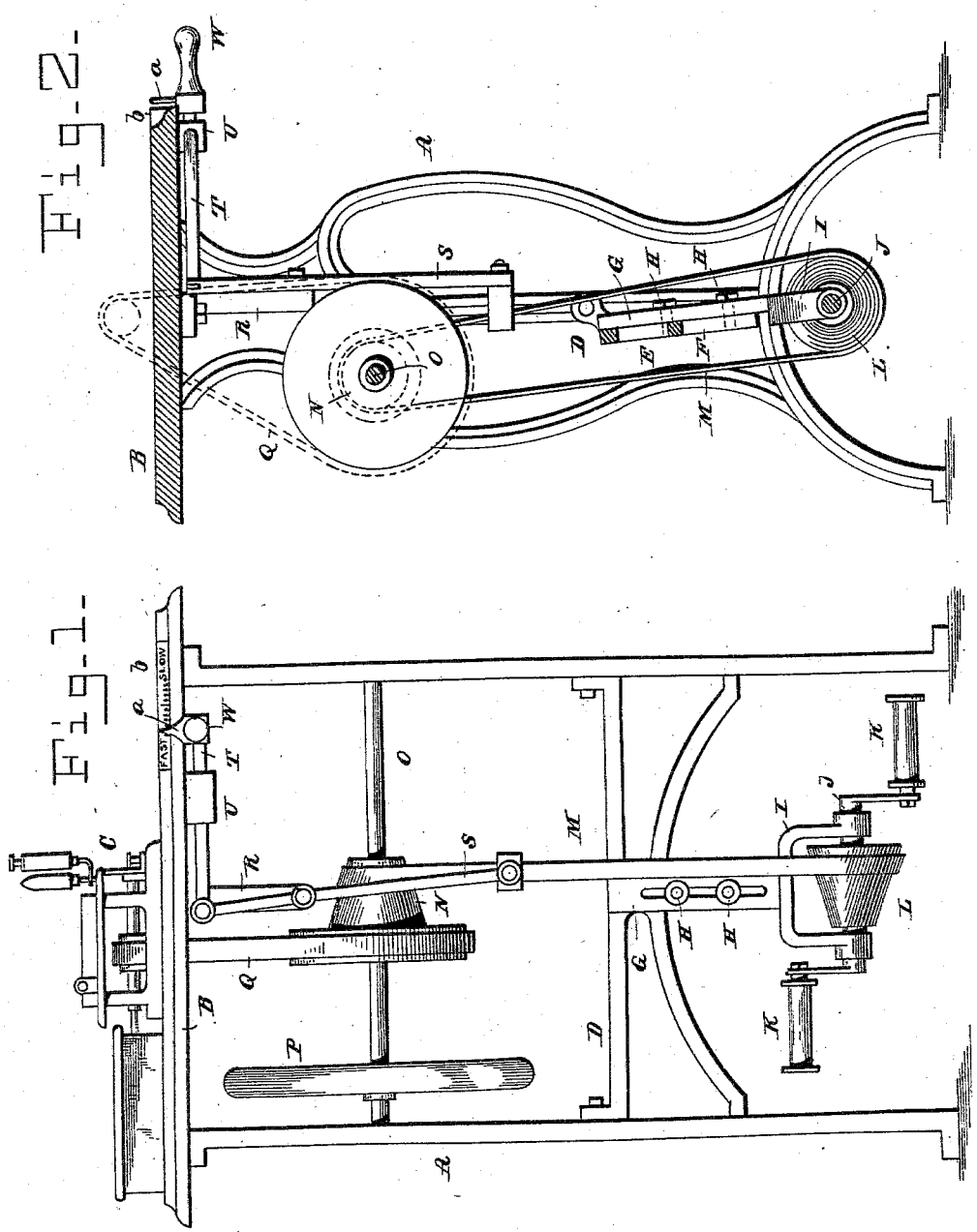
WITNESSES
Edwin L. Jewell
Joe. H. Hunter
INVENTOR
Henry Leeming.
By Toulmin & Toulmin,
Attorneys.

(No Model.) 2 Sheets—Sheet 2.

H. LEEMING.
TREADLE MECHANISM.

No. 296,854. Patented Apr. 15, 1884.

WITNESSES
Edwin L. Yewell.
Jos. H. Hunter.

INVENTOR
Henry Leeming.
By Toulmin & Jemmes Attorneys.

N. PETERS, Photo-Lithographer, Washington, D. C.

UNITED STATES PATENT OFFICE.

HENRY LEEMING, OF MANCHESTER, COUNTY OF LANCASTER, ENGLAND.

TREADLE MECHANISM.

SPECIFICATION forming part of Letters Patent No. 296,854, dated April 15, 1884.

Application filed January 24, 1884. (No model.)

*To all whom it may concern:*

Be it known that I, HENRY LEEMING, a subject of the Queen of Great Britain, residing at Manchester, in the county of Lancaster, England, have invented certain new and useful Improvements in Treadle Mechanism, of which the following is a specification, reference being had therein to the accompanying drawings.

This invention relates to certain new and useful improvements in treadle mechanism; and it is especially designed and adapted to be used in connection with sewing-machines. It has for its objects, first, to provide means for varying the speed at which the machine is driven without increasing or decreasing the momentum of the driving-shaft; second, to provide means for quickly changing the speed; third, to provide means for indicating the rate of speed, whether slow or fast, or intermediate these extremes; fourth, to provide means for taking up any slack which may have resulted in the belt from usage or be incident to an alternate dry or damp atmosphere; and, fifth, to provide such an arrangement of the driving-pulley relatively to the treadles as to exert equal power on either side of the pulley.

In carrying out the first object of my invention, I employ a driving-pulley having a cone-shaped exterior, in combination with an auxiliary driving-shaft having a like pulley, the two being geared together by means of a belt, and having their contracted ends oppositely disposed.

In carrying out the second object of my invention, I employ a belt-shifter adapted to be operated so as to shift the belt on the driving and auxiliary pulleys in either direction.

In carrying out the third object of my invention, I provide the belt-shifter at some convenient point with a pointer, near which is located a graduated plate or scale, whereby the speed which the auxiliary pulley is traveling may be indicated.

In carrying out the fourth object of my invention, I mount the driving-shaft in journals capable of adjustment to and from the auxiliary shaft, whereby the variable length of the belt passing over the driving and auxiliary pulleys may be accommodated.

In carrying out the fifth object of my invention, I suspend the driving-shaft in such a manner as to leave the ends beyond the bearings free to receive treadles at either side of the driving-pulley.

Figure 3:
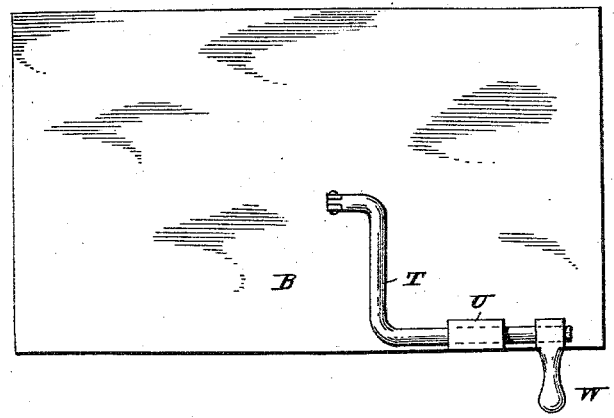
Figure 4:
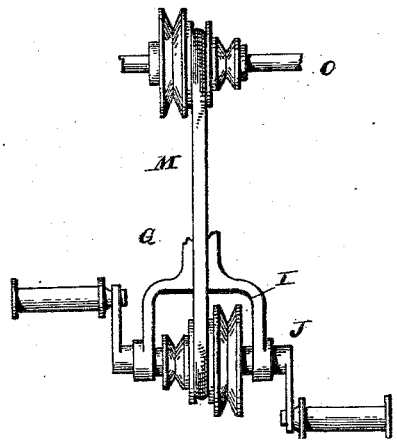
Figure 5:
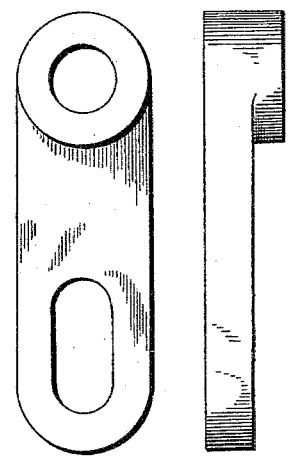

In the accompanying drawings, forming a part of this specification, and on which like letters of reference indicate corresponding features, Figure 1 represents a side elevation of a sewing-machine stand with a machine mounted thereon, and having my improved treadle mechanism applied thereto. Fig. 2 represents a transverse vertical sectional view on the line *x x* of Fig. 1, the machine proper being removed; Fig. 3, an inverted plan view of the stand-top, showing the arm for actuating the belt-shifter; Fig. 4, a side elevation of a modified form of the driving and auxiliary pulleys; and Fig. 5, a front and edge view of the crank, showing the slot in the outer end thereof, whereby the treadle and foot-piece are radially adjusted.

The letter A refers to the frame of an ordinary sewing-machine stand, the same being provided with the usual top, B, and a machine, C, of any approved make. Secured to the lower part of the frame is a bracket, D, depending centrally from which is an extension, E, provided with two or more slots, F.

The letter G refers to the upper portion of the main driving-shaft hanger, the said portion being provided with slots substantially agreeing with those in the extension E, to which it is adjustably secured by means of bolts or equivalent devices H. The lower portion of the hanger consists of a yoke, I, the termini or extremities of which are constructed to form bearings, in which is mounted a driving-shaft, J. At either end of this shaft is provided the treadle K, the foot-pieces of which, if desired, may be capable of radial adjustment, so as to vary the sweep of the foot during the revolution of the crank. Mounted rigidly upon this shaft is a conical driving-pulley, L, over which travels a belt, M, of leather or other approved material. This belt also passes over an auxiliary conical pulley, N, the diametrically-contracted ends of these respective pulleys being oppositely disposed. The pulley N is mounted upon the auxiliary shaft O, whose bearings are located at any convenient point of the frame, and which is provided with a fly or balance wheel, P. The pulley N is either provided with a parallel periphery constituting a pulley for the sewing-machine belt Q, or the auxiliary shaft O is provided with a separate pulley for this purpose.

Depending from a convenient part of the stand-top is a hanger, R, to which is fulcrumed the belt-shifter S, the lower end of which is provided with a lateral bifurcated extension, the respective members of which embrace opposite sides of the belt M. The upper end of this shifter is flexibly connected with one branch or member of the operating-arm T, the said arm being supported by bearing U, so as to admit of a movement in either direction. Extending from the handle W of this arm is a pointer, a, adapted to indicate, in conjunction with the graduated plate or scale b, the position of the belt upon the driving and auxiliary pulleys.

It will be observed that when the machine is in motion, and it is desired to increase the speed of the machine without accelerating the momentum of the driving-shaft, it is simply necessary to move the arm T in the direction of the word "fast," or the character indicating the same, on the plate b, the belt-shifter being thus made to engage the belt M and guide or shift it on the pulleys, as indicated in Fig. 1, it occupying the major diameter of the driving-pulley and the minor diameter of the auxiliary pulley. To decrease the speed of the machine without varying the speed of the driving-shaft, it is simply necessary to operate the arm T in the reverse direction until the pointer reaches the word "slow," or the character indicating the same, on the plate b, the belt in this instance occupying the minor diameter of the driving-pulley and the major diameter of the auxiliary pulley. Should an intermediate speed be required, the pointer should be placed at points intermediate the words "fast" and "slow." It should be observed that the power required and the power exerted vary according to the position of the belt M on the pulleys. The adjustability of the hanger, which carries the main driving-shaft, relatively with the shaft carrying the auxiliary pulley, admits of taking up the slack of the belt M, or of accommodating the distance between the driving-pulley and the auxiliary pulley, according to the expansion and contraction of the belt, incident to a dry or damp atmosphere.

It is apparent that my invention may be practically applied to the accomplishment of important results to machines other than of the character hereinbefore alluded to, its adaptability to the various foot-power apparatus being simply the work of application, with the incidental modification of the relative arrangement of its respective features, to meet the practical conditions peculiar to any particular class of apparatus.

As seen in Fig. 4, it will be observed that, instead of constructing the driving and auxiliary pulleys with conical exteriors, I have provided their peripheries with a series of grooves, which are located in line with each other, and are of such relative diameter in the respective pulleys as to cause the belt to fit either sets of grooves. These pulleys are mounted in the same manner as the others.

Having thus fully described my invention, what I claim as new, and desire to secure by Letters Patent, is—

1. In treadle mechanism, the combination, with the driving-pulley having a cone-shaped exterior and an adjustable hanger, constructed substantially as described, in which its shaft is mounted, of the auxiliary driving-shaft having a like pulley, the two being geared together by means of a belt and having their contracted ends oppositely disposed.

2. In treadle mechanism, the combination, with the driving-pulley having a cone-shaped exterior, and having its shaft mounted in an adjustable hanger, and the auxiliary shaft having a like pulley, of the belt and the belt-shifter, adapted to shift the belt laterally on the pulleys.

3. In treadle mechanism, the combination of a belt-shifter provided with a pointer with a speed-indicating plate, whereby the position of the belt on the pulleys is shifted and the speed indicated.

4. In treadle mechanism, the combination, with a pivoted belt-shifter having a bifurcated extension adapted to embrace the belt, and the arm connected to its upper end, supported by a bearing, and having a pointer, of an indicator-plate provided with characters or words to indicate fast or slow or intermediate speed, according to the position of the pointer.

5. In treadle mechanism, the combination, with the supporting-bracket, of a shaft-hanger secured thereto and capable of adjustment.

6. In treadle mechanism, the combination, with the adjustable hanger having its extremities constructed to form bearings, of a driving-shaft provided with a driving-pulley, and treadles secured thereto at either side of the pulley.

7. In treadle mechanism, the combination, with an adjustable hanger, the driving-shaft mounted therein, and provided with a cone-shaped driving-pulley, and treadles secured to either side thereof, of an auxiliary shaft having a like pulley, the contracted ends of the said pulleys being oppositely disposed.

In testimony whereof I affix my signature in presence of two witnesses.

HENRY LEEMING.

Witnesses:
 JOHN MCKAY,
*Draftsman, Richards & Atkinson, Manchester.*
 S. W. BROWN,
*Clerk with E. B. Rowley, Notary Public, Manchester.*